US009603069B2

(12) United States Patent
Shahidi et al.

(10) Patent No.: US 9,603,069 B2
(45) Date of Patent: Mar. 21, 2017

(54) MANAGING MOBILITY EVENTS IN SIMULTANEOUS RAT MODE USER EQUIPMENT

(71) Applicant: QUALCOMM Incorporated, San Diego, CA (US)

(72) Inventors: Reza Shahidi, San Diego, CA (US); Subashini Krishnamurthy, San Diego, CA (US); Scott Allan Hoover, Del Mar, CA (US); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 14/299,737

(22) Filed: Jun. 9, 2014

(65) Prior Publication Data
US 2014/0364123 A1 Dec. 11, 2014

Related U.S. Application Data

(60) Provisional application No. 61/833,221, filed on Jun. 10, 2013.

(51) Int. Cl.
*H04W 36/00* (2009.01)
*H04W 48/18* (2009.01)
*H04W 36/14* (2009.01)
*H04W 88/06* (2009.01)

(52) U.S. Cl.
CPC ....... *H04W 36/0083* (2013.01); *H04W 48/18* (2013.01); *H04W 36/14* (2013.01); *H04W 88/06* (2013.01)

(58) Field of Classification Search
CPC ..... H04W 36/00; H04W 36/14; H04W 48/18; H04W 88/06; H04W 36/0083

USPC ....... 455/437, 436, 438, 439, 440, 441, 442, 455/443, 444, 445
See application file for complete search history.

(56) References Cited

U.S. PATENT DOCUMENTS

| 2009/0290555 | A1* | 11/2009 | Alpert et al. ................ 370/331 |
| 2011/0149907 | A1* | 6/2011 | Olsson .............. H04W 36/0022 370/331 |
| 2012/0088499 | A1 | 4/2012 | Chin et al. |
| 2012/0257550 | A1 | 10/2012 | Chin et al. |
| 2013/0010656 | A1 | 1/2013 | Chin et al. |
| 2014/0023003 | A1 | 1/2014 | De Pasquale et al. |

(Continued)

FOREIGN PATENT DOCUMENTS

WO WO-2013006835 A1 1/2013

OTHER PUBLICATIONS

International Search Report and Written Opinion—PCT/US2014/041727—ISA/EPO—Oct. 6, 2014.

*Primary Examiner* — Temica M Beamer
*Assistant Examiner* — Sayed T Zewari
(74) *Attorney, Agent, or Firm* — Norton Rose Fulbright US LLP

(57) ABSTRACT

Mobility management is described for simultaneous, multiple radio access technology (RAT) user equipments (UEs). When the UE detects a mobility event that would trigger transfer of a communication service from a first RAT to a second RAT, the UE determines whether there is an existing connection to a base station of the second RAT and uses cached measurement information related to this base station to influence or weight how the transfer is performed/handled/managed.

20 Claims, 9 Drawing Sheets

(56) References Cited

U.S. PATENT DOCUMENTS

2014/0113630 A1   4/2014  Vangala et al.

* cited by examiner

US 9,603,069 B2

MANAGING MOBILITY EVENTS IN SIMULTANEOUS RAT MODE USER EQUIPMENT

CROSS-REFERENCE TO RELATED APPLICATIONS

This application claims the benefit of U.S. Provisional Patent Application No. 61/833,221, entitled, "INFLUENCING MOBILITY EVENTS IN SIMULTANEOUS RAT MODE USER EQUIPMENT", filed on Jun. 10, 2013, which is expressly incorporated by reference herein in its entirety.

BACKGROUND

Field

Aspects of the present disclosure relate generally to wireless communication systems, and more particularly, to managing mobility events in simultaneous radio access technology (RAT) mode user equipments (UEs).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters.

As the demand for mobile broadband access continues to increase, the use of more than one network or radio access technology (RAT) for wireless communications is becoming more prevalent and devices with the capability of simultaneously accessing multiple RATs are widely available. Management of mobility and mobility events in the case of simultaneous access to multiple RATs remains an important for enhancing the user experience with mobile communications and efficient network operation.

SUMMARY

In one aspect of the disclosure, a method of wireless communication includes detecting, at a UE, a mobility event triggering transfer of first communication services at the UE from a first RAT to a second RAT, wherein the UE is configured for simultaneous communication with the first and second RATs, determining, by the UE, an existing connection to a first base station of the second RAT for second communication services, receiving, by the UE, mobility transfer information from a second base station of the first RAT related to the transfer, wherein the mobility transfer information includes information for measurement of a plurality of neighboring second RAT base stations, and influencing, by the UE, selection of the first base station for the transfer of the first communication services to the first RAT by the UE using only cached measurement information related to the first base station.

In an additional aspect of the disclosure, an apparatus configured for wireless communication includes means for detecting, at a UE, a mobility event triggering transfer of first communication services at the UE from a first RAT to a second RAT, wherein the UE is configured for simultaneous communication with the first and second RATs, means for determining, by the UE, an existing connection to a first base station of the second RAT for second communication services, means for receiving, by the UE, mobility transfer information from a second base station of the first RAT related to the transfer, wherein the mobility transfer information includes information for measurement of a plurality of neighboring second RAT base stations, and means for influencing, by the UE, selection of the first base station for the transfer of the first communication services to the first RAT by the UE using only cached measurement information related to the first base station.

In a further aspect of the disclosure, a computer program product for wireless communications in a wireless network includes a non-transitory computer-readable medium having program code recorded thereon. The program code includes code to detect, at a UE, a mobility event, triggering transfer of first communication services at the UE from a first RAT to a second RAT, wherein the UE is configured for simultaneous communication with the first and second RATs, code to determine, by the UE, an existing connection to a first base station of the second RAT for second communication services, code to receive, by the UE, mobility transfer information from a second base station of the first RAT related to the transfer, wherein the mobility transfer information includes information for measurement of a plurality of neighboring second RAT base stations, and code to influence, by the UE, selection of the first base station for the transfer of the first communication services to the first RAT by the UE using only cached measurement information related to the first base station.

In another aspect of the disclosure, an apparatus configured for wireless communication includes a memory and at least one processor. The processor is configured to detect, at a UE, a mobility event triggering transfer of first communication services at the UE from a first RAT to a second RAT, wherein the UE is configured for simultaneous communication with the first and second RATs, to determine, by the UE, an existing connection to a first base station of the second RAT for second communication services, to receive, by the UE, mobility transfer information from a second base station of the first RAT related to the transfer, wherein the mobility transfer information includes information for measurement of a plurality of neighboring second RAT base stations, and to influence, by the UE, selection of the first base station for the transfer of the first communication services to the first RAT by the UE using only cached measurement information related to the first base station.

In an additional aspect of the present disclosure, a method of wireless communication includes detecting, at a UE, a mobility event triggering transfer of first communication services at the UE from a first RAT to a second RAT, wherein the UE is configured for simultaneous communication with the first and second RATs, determining, by the UE, an existing connection to a first base station of the second RAT for second communication services, receiving, by the UE, mobility transfer information from a second base station of the first RAT related to the transfer, wherein the UE is in an idle state with the second base station of the first RAT and the mobility transfer information includes information for measurement of a plurality of neighboring second RAT base stations, and modifying, by the UE, evaluation of reselection criteria for selection of the first base station for the transfer of the first communication services to the first RAT, wherein the modifying comprises evaluating the reselection criteria using only the cached measurement information for the first base station.

In an additional aspect of the present disclosure, an apparatus configured for wireless communication includes means for detecting, at a UE, a mobility event triggering transfer of first communication services at the UE from a first RAT to a second RAT, wherein the UE is configured for simultaneous communication with the first and second RATs, means for determining, by the UE, an existing connection to a first base station of the second RAT for second communication services, means for receiving, by the UE, mobility transfer information from a second base station of the first RAT related to the transfer, wherein the UE is in an idle state with the second base station of the first RAT and the mobility transfer information includes information for measurement of a plurality of neighboring second RAT base stations, and means for modifying, by the UE, evaluation of reselection criteria for selection of the first base station for the transfer of the first communication services to the first RAT, wherein the means for modifying comprises means for evaluating the reselection criteria using only the cached measurement information for the first base station.

In an additional aspect of the present disclosure, a computer program product for wireless communications in a wireless network includes a non-transitory computer-readable medium having program code recorded thereon. The program code includes code to detect, at a UE, a mobility event triggering transfer of first communication services at the UE from a first RAT to a second RAT, wherein the UE is configured for simultaneous communication with the first and second RATs, code to determine, by the UE, an existing connection to a first base station of the second RAT for second communication services, receiving, by the UE, mobility transfer information from a second base station of the first RAT related to the transfer, wherein the UE is in an idle state with the second base station of the first RAT and the mobility transfer information includes information for measurement of a plurality of neighboring second RAT base stations, and code to modify, by the UE, evaluation of reselection criteria for selection of the first base station for the transfer of the first communication services to the first RAT, wherein the code to modify comprises code to evaluate the reselection criteria using only the cached measurement information for the first base station.

In an additional aspect of the present disclosure, an apparatus configured for wireless communication includes a memory and at least one processor. The processor is configured to detect, at a UE, a mobility event triggering transfer of first communication services at the UE from a first RAT to a second RAT, wherein the UE is configured for simultaneous communication with the first and second RATs, to determine, by the UE, an existing connection to a first base station of the second RAT for second communication services, receiving, by the UE, mobility transfer information from a second base station of the first RAT related to the transfer, wherein the UE is in an idle state with the second base station of the first RAT and the mobility transfer information includes information for measurement of a plurality of neighboring second RAT base stations, and to modify, by the UE, evaluation of reselection criteria for selection of the first base station for the transfer of the first communication services to the first RAT, wherein the configuration of the at least one processor to modify comprises configuration to evaluate the reselection criteria using only the cached measurement information for the first base station.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
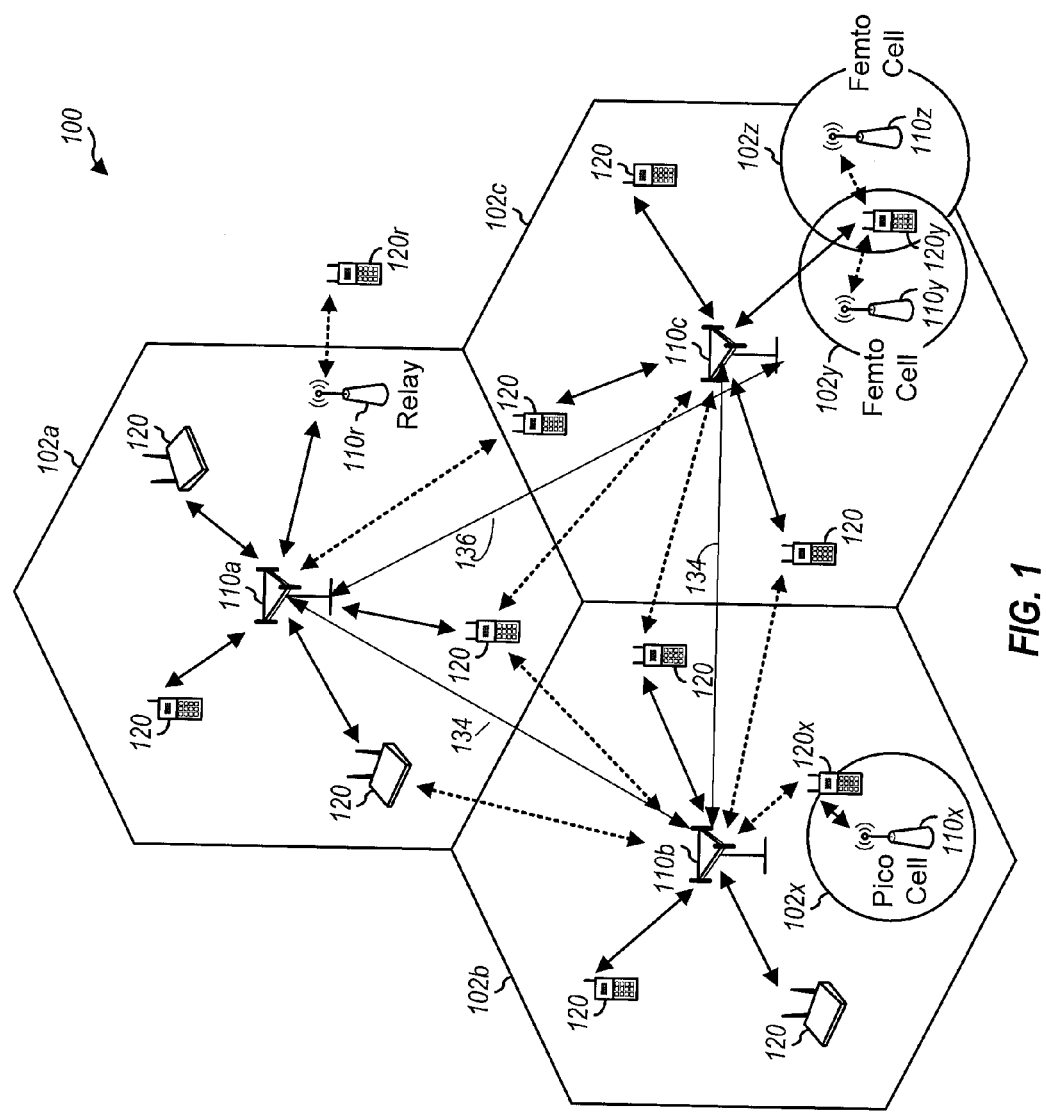
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

Figure 2:
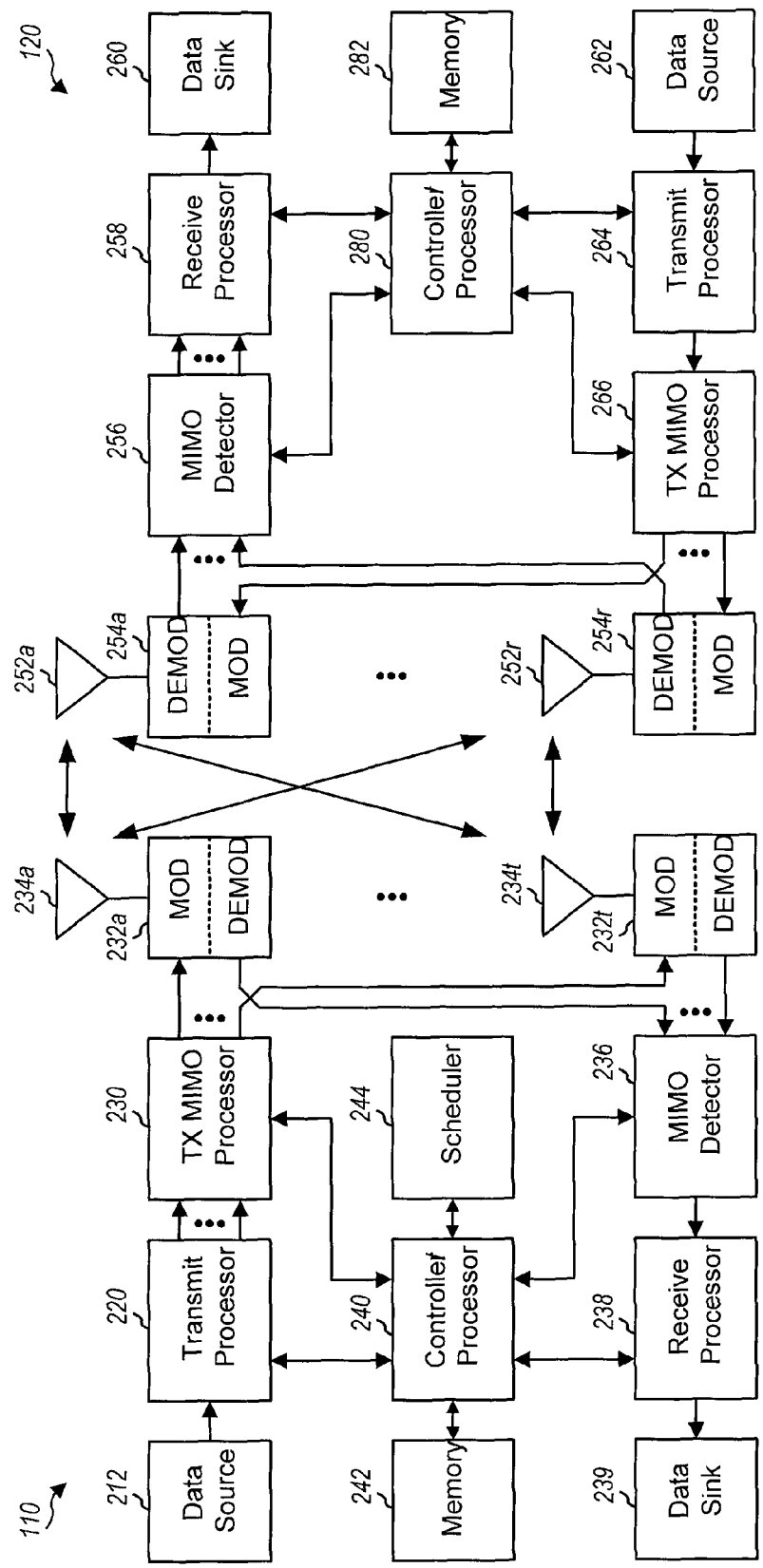
FIG. 2 is a block diagram illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 5, 6A, and 6B, and/or other processes for the techniques described herein. The memories 242 and 282 may store data and program codes for the eNB 110 and the UE 120, respectively. A scheduler 244 may schedule UEs for data transmission on the downlink and/or uplink.

Various multiple radio access technologies (RATs) are deployed by service providers as advances in technologies occur. Because of time and cost considerations, an entire wireless system may not be immediately replaced or upgraded to the next generation RAT. As such, it is common to find multiple RATs deployed throughout any given geographic region. Mobile operators may take advantage of the mixed RAT deployments by providing for certain services to be handled by one RAT while other services are handled by another coexisting RAT. For example, LTE may have better performance with packet switched communications while GSM is available for circuit switched communications. GSM is also capable of handling packet switched communications; however, when it is available, LTE may be preferred for these services.

Mobile operators and mobile device manufacturers may take advantage of this dual operation by providing simultaneous RAT operation and devices. For example, single subscriber identity module (SIM) dual active (SSDA) devices, such as simultaneous GSM voice and LTE data (SGLTE) or simultaneous GSM voice and time division synchronous code division multiple access (TD-SCDMA) data (SGTDS) devices, have a dedicated radio for GSM and another dedicated radio for the other RAT (e.g., LTE, TD-SCDMA, etc.). In such devices, mobility events may be triggered to transfer service on one RAT to the other RAT. In one example, the transfer procedure may call for measurements of neighboring GSM cells on a first RAT to facilitate an evaluation and reselection to the GSM cell that meets the mobility evaluation criteria. However, in such simultaneous dual radio UEs, there may already be a connection to a GSM cell on the first RAT. Thus, if a mobility event triggers a transfer procedure from the second RAT to GSM, the existing GSM connection may be interrupted in order to complete the RAT transfer. Accordingly, various aspects of the present disclosure are directed to evaluating mobility procedures in such a way so as to keep the existing connection to the first RAT service intact on the UE while facilitating the mobility procedure from the second RAT to the first RAT. Moreover, in this example, when the GSM cell on the first RAT was initially determined, it was judged as being suitable for communication over the first RAT. Thus, according to the present disclosure, it is contemplated that the existing cell or base station on a RAT remains suitable for use when services are transferred from another RAT and that it can be desirable for such services to be transferred to that same base station or cell rather than to some other destination on the first RAT.

Figure 3:
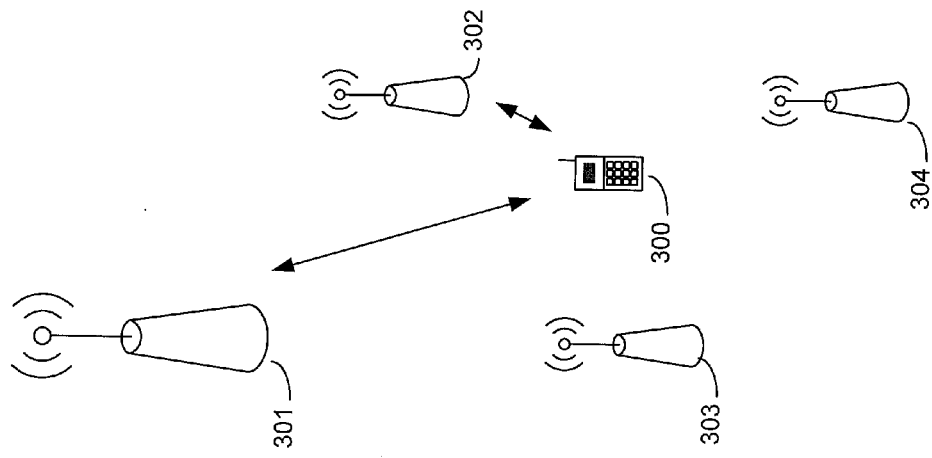
FIG. 3 is a block diagram illustrating a UE configured as a simultaneous dual RAT device and configured according to one aspect of the present disclosure.

FIG. 3 is a block diagram illustrating a UE 300 configured as a simultaneous dual RAT device and configured according to one aspect of the present disclosure. In this example, UE 300 is shown as being camped on RAT 1 cell 301 and associated with RAT 2 cell 302. The association between UE 300 and RAT 2 cell 302 may be an active communication with RAT 2 cell 302 or UE 300 may camped on RAT 2 cell 302 and in an idle mode. A mobility event occurs at the UE 300 in relation to RAT 2 cell 302. The mobility event triggers an evaluation process that would operate to transfer the communication service handled by RAT 2 cell 302 to a RAT 1 network. A typical mobility evaluation process would require UE 300 to make signal quality measurements for each of the RAT 1 neighboring cells, such as RAT 1 cells 301, 303, and 304. However, UE 300 already is camped on RAT 1 cell 301.

Were the result of the measurements and mobility evaluation procedure to conclude that UE 300 should transfer the communication service (e.g., through reselection, redirection, handover, etc.) to RAT 1 cell 303, UE 300 would be required to transfer the existing communication service already associated with RAT 1 cell 301 to RAT 1 cell 303. This operation would interrupt the current service and could involve transferring to an undesirable RAT 1 cell. For example, either because of a more favorable subscription rate associated with RAT 1 cell 301, or perhaps because UE 300 is moving in a direction that will result in a transfer back to RAT 1 cell 301, UE 300 may be transferred to RAT 1 cell 303 only to be quickly transferred back to RAT 1 cell 301. These interruptions in the existing communication service with RAT 1 cell 301 and the multiple transfers will cause a substantial delay in communications with UE 300 and may negatively impact power consumption at UE 300 due to the additional transfer requirements.

When the UE 300 uses two RATs, instead the typical mobility evaluation procedure can be modified according to one aspect of the present disclosure. In one aspect, when the mobility event is triggered, UE 300 checks to determine whether it is already associated with a RAT 1 cell. If UE 300 is already associated with a RAT 1 cell, such as RAT 1 cell 301, UE 300 will modify its actions in order to influence the mobility procedure. For example, UE 300 can influence the mobility procedure by using existing cached measurement information regarding the serving RAT 1 cell, RAT 1 cell 301. Instead of performing new measurements of neighboring RAT 1 cells, UE 300 substitutes the existing measurement information cached for RAT 1 cell 301 and either uses that cached measurement information to make a reselection determination to reselect RAT 1 cell 301 from the communication service ongoing with RAT 2 cell 302, or packages the cached measurement information for RAT 1 cell 301 into a measurement report and sends that measurement report to RAT 2 cell 302 for handover evaluation. As the measurement report will only include the measurement information for RAT 1 cell 301, the handover determination will be weighted to select RAT 1 cell 301 for handover.

Figure 4:
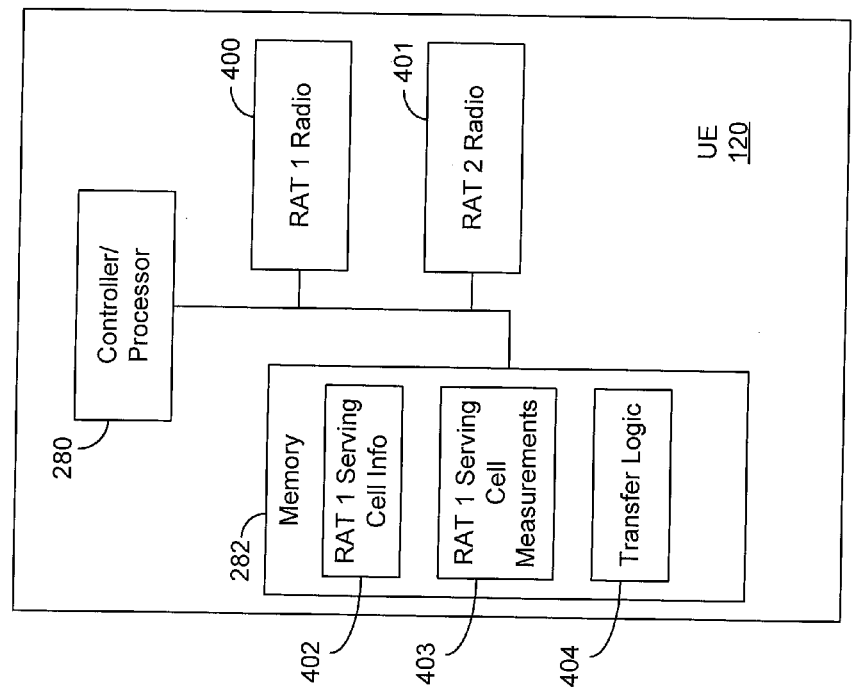
FIG. 4 is a block diagram illustrating a UE configured according to one aspect of the present disclosure.

FIG. 4 is a block diagram illustrating a UE 120 configured according to one aspect of the present disclosure. As shown, UE 120 is a simultaneous multiple RAT device that includes RAT 1 radio 400 dedicated for communication services with RAT 1 and RAT 2 radio 401 dedicated for communication services with RAT 2. RAT 1 and RAT 2 are different from each other, but may be any number of various RATs, including GSM, LTE, TD-SCDMA, WIFI, etc. UE 120 is also configured for simultaneous communication through RAT 1 radio 400 and RAT 2 radio 401. Controller/processor 280 is one or more processors or processor cores and controllers that executes the features and functionalities of UE 120 in order to operate according to the capabilities of UE 120. Controller/processor 280 controls RAT 1 radio 400 and RAT 2 radio 401 and also executes logic and controls use and access to information stored in memory 282.

In an example operation, UE 120 simultaneously maintains communication services through RAT 1 radio 400 and RAT 2 radio 401. For purposes of this example, UE 120 maintains circuit switched communication service through RAT 1, with RAT 1 radio 400, and packet switched communication service through RAT 2, with RAT 2 radio 401. A mobility event occurs, such as signal strength of the reference signal of the RAT 2 cell communicating with RAT 2 radio 401 dropping below a predetermined threshold. UE 120, under control of controller/processor 280, obtains RAT 1 serving cell information 402, stored in memory 282.

Depending on whether UE 120 will perform reselection, handover, or redirection from a RAT 2 cell to a RAT 1 cell, UE 120 uses RAT 1 serving cell measurements 403 to coordinate or influence any transfer decisions. For example, when UE 120 is in an idle state on the RAT 2 cell, RAT 1 serving cell measurements 403 may include the received signal strength indicator (RSSI), which UE 120, under control of controller/processor 280, will use to evaluate a reselection to the existing connection with a RAT 1 cell through RAT 1 radio 400. When UE 120 is in a connected state on the RAT 2 cell, RAT 1 serving cell measurements will be the cached measurement information for the current RAT 1 serving cell. UE 120, under control of controller/processor 280, will send this measurement information as a measurement report to the RAT 2 serving cell without actually performing any measurements of neighboring RAT 1 cells. The RAT 2 serving cell will use this weighted measurement information to determine handover or redirection to the current RAT 1 serving cell through RAT 1 radio 400. Once the transfer determination has been made, whether through reselection, handover, or redirection, UE 120, under control of controller/processor 280 will executed transfer logic 404, stored in memory 282, to transfer the packet switched communication service, which it generally may perform with RAT 2 over to RAT 1, using the existing connection to the RAT 1 serving cell in communication with RAT 1 radio 400. Transfer logic 404 includes the processes and actions used by UE 120 to perform either reselection, handover, or redirection, as the case may be.

Figure 5:
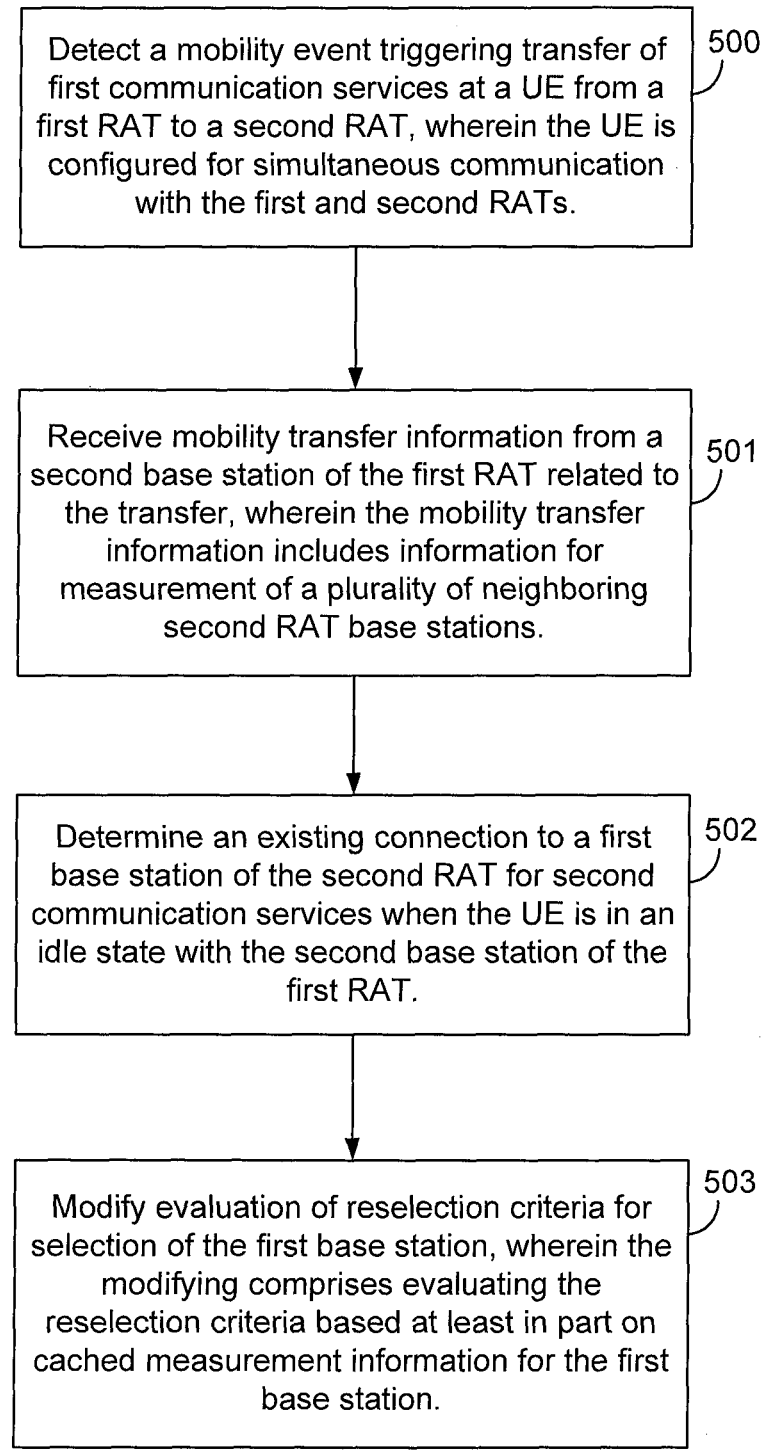
FIG. 5 is a functional block diagram illustrating example blocks executed to implement one aspect of the present disclosure.

FIG. 5 is a functional block diagram illustrating example blocks executed to implement one aspect of the present disclosure. At block 500, a UE detects a mobility event that triggers potential transfer of a first communication services being conducted through a first RAT with the UE from the first RAT to a second RAT. The UE is configured for simultaneous communication with the first and second RATs. Therefore, while some communication services are going on at the first RAT, simultaneous communications may be going on at the second RAT with the UE.

At block 501, the UE receives mobility transfer information from a second base station of the first RAT related to the transfer of the first communication services from the first RAT to the second RAT, wherein the mobility transfer information includes information for measurement of a plurality of neighboring second RAT base stations. The mobility transfer information may be a neighbor cell list of cells configured for the second RAT, measurement objects directing the UE to measure various neighboring cells configured for the second RAT, or the like. At block 502, the UE determines an existing connection to a first base station of the second RAT for a second communication service when the UE is in an idle state with the second base station of the first RAT.

At block 503, the UE modifies evaluation of reselection criteria for selection of the first base station, wherein the modifying comprises evaluating the reselection criteria based at least in part on cached measurement information for the first base station. When the UE is in an idle mode with respect to the first RAT, the UE may evaluate cell reselection criteria immediately on the cached measurement information, such as a signal strength indicator with the first base station for the second RAT base station to make a handover decision based on the cached measurement information of the currently connected first base station.

It should be noted that, depending on the system configuration, the UE may only use the cached measurement information if the first base station is found in either the neighbor list or with the measurement objects received from the base station of the second RAT. Otherwise, the UE proceeds as if there are no neighboring second RAT base stations to receive the transfer. The system may also be configured to use the cached measurement information related to the currently connected second RAT base station regardless of whether it is included in the information received from the first RAT base station or not. The various aspects of the present disclosure are not limited to any one particular system configuration.

Figure 6A:
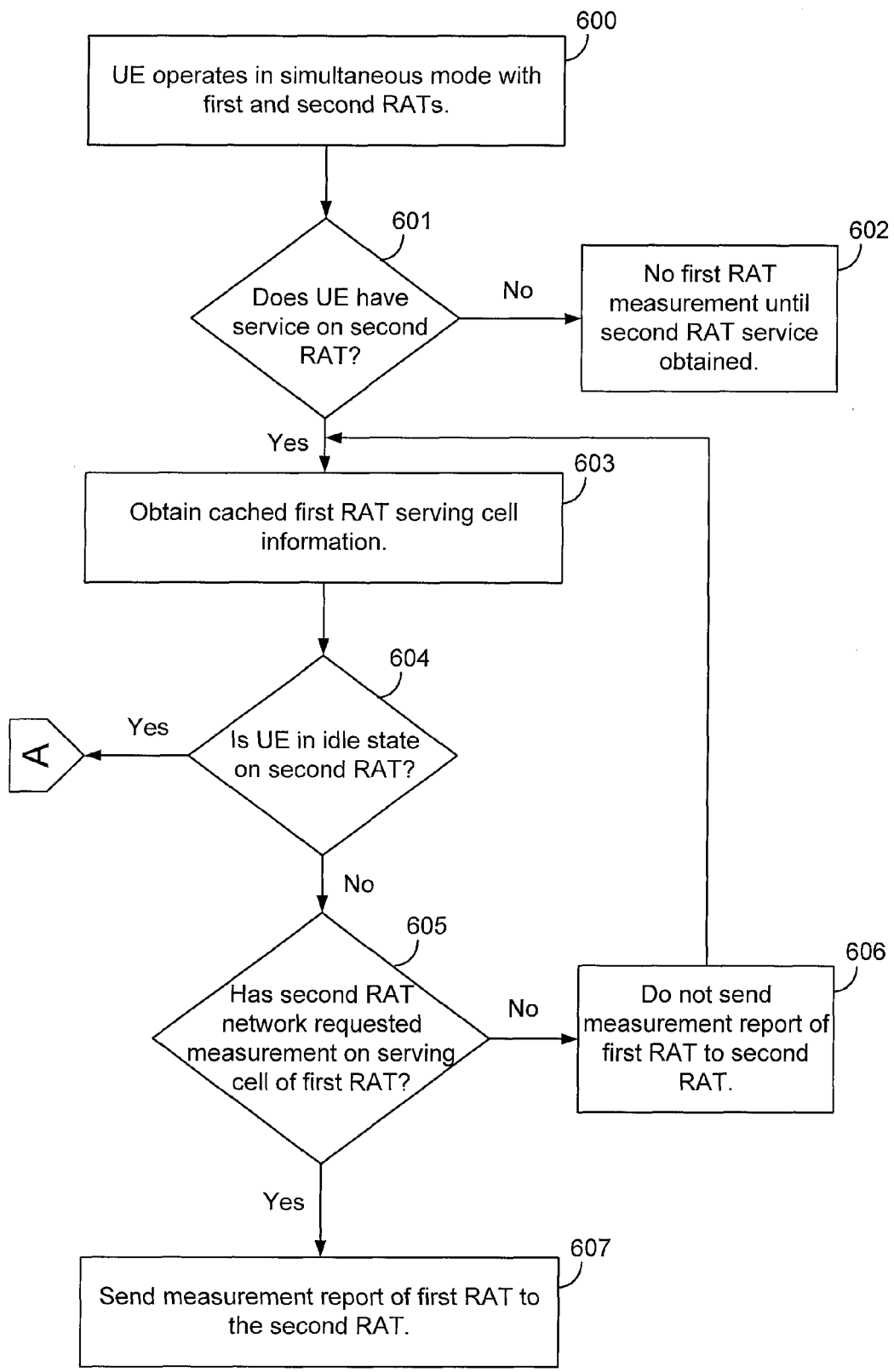
FIGS. 6A-6B are functional block diagrams illustrating example blocks executed to implement one aspect of the present disclosure.
Figure 6B:
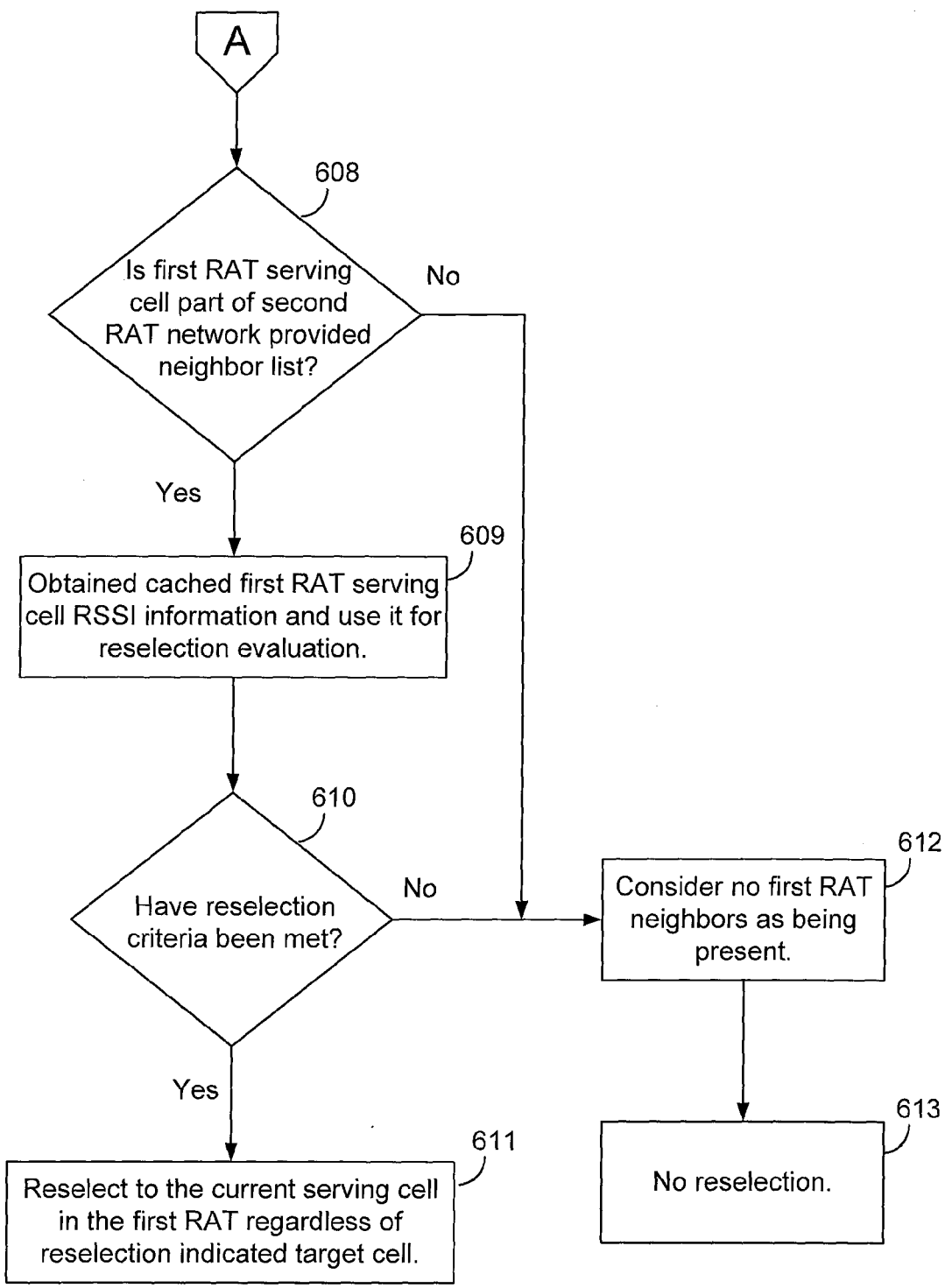

FIGS. 6A-6B are diagrams illustrating example blocks executed to implement one aspect of the present disclosure. Beginning with FIG. 6A, at block 600, a UE operates in a simultaneous mode with communication services using two different RATs, first and second RATs. The first and second RATs may be various different types of RAT, such as GSM, LTE, TD-SCDMA, WIFI, and the like. At block 601, a determination is made whether the UE has service on the second RAT. For example, if the first RAT would be GSM and the second RAT would be LTE, the UE would determine whether it has service on LTE. If there is no service on the second RAT, then, at block 602, no measurements involving the first RAT are necessary until service on the second RAT is obtained. Without service on the second RAT, there would be no necessity for mobility between the RATS. Accordingly, no measurements would be needed.

If the UE does have service on the second RAT, then, at block 603, the UE obtains information about the current serving cell of the first RAT that is cached in the memory of the UE. The cached information will allow the UE to know that there is a currently serving cell for first RAT communications.

At block 604, a determination is made whether the UE is in an idle state on the second RAT. The state of the UE on the second RAT will determine how the communication services with the second RAT of the UE may be transferred from the second RAT to the first RAT. If the UE is not in an idle state, then, at block 605, another determination is made whether the second RAT has requested first RAT measurements that include the first RAT serving cell. If not, then, at block 606, no measurement report will be sent to the second RAT. The process would then continue from block 603.

If the second RAT has requested first RAT measurements that include the first RAT serving cell, then, at block 607, the UE retrieves the cached measurement information associated with the first RAT serving cell and sends that measurement information in a measurement report to the second RAT. The second RAT will then make a handover or redirection determination based only on the measurement information from the current first RAT serving cell of the UE.

Continuing with FIG. 6B, if the determination at block 604 is that the UE is in an idle mode on the second RAT, then process A continues with a determination, at block 608, whether the first RAT serving cell is part of the first RAT neighbor list obtained from the second RAT. If the first RAT serving cell is not part of the neighbor list, then, at block 612, UE operates as if no first RAT neighbor cells are present, with, at block 613, no reselection occurring.

If the first RAT serving cell is on the neighbor list provided by the second RAT, then, at block 609, the UE obtains cached signal strength information, such as an RSSI, and uses the signal strength information to evaluate reselection to the first RAT serving cell. A determination is made, at block 610, whether the reselection criteria have been met. If not, then the UE again, at block 612, operates as if no first RAT neighbor cells are present. However, if the reselection criteria have been met, then, at block 611, the UE reselects the first RAT serving cell for the communication services that were being provided through the second RAT. By using the existing measurements for the first RAT serving cell and modifying the evaluation procedure for reselection, the UE reselects to the first RAT serving cell will regardless of whether it would have selected a different first RAT serving cell, for example, were there no existing association with the first RAT.

Figure 7:
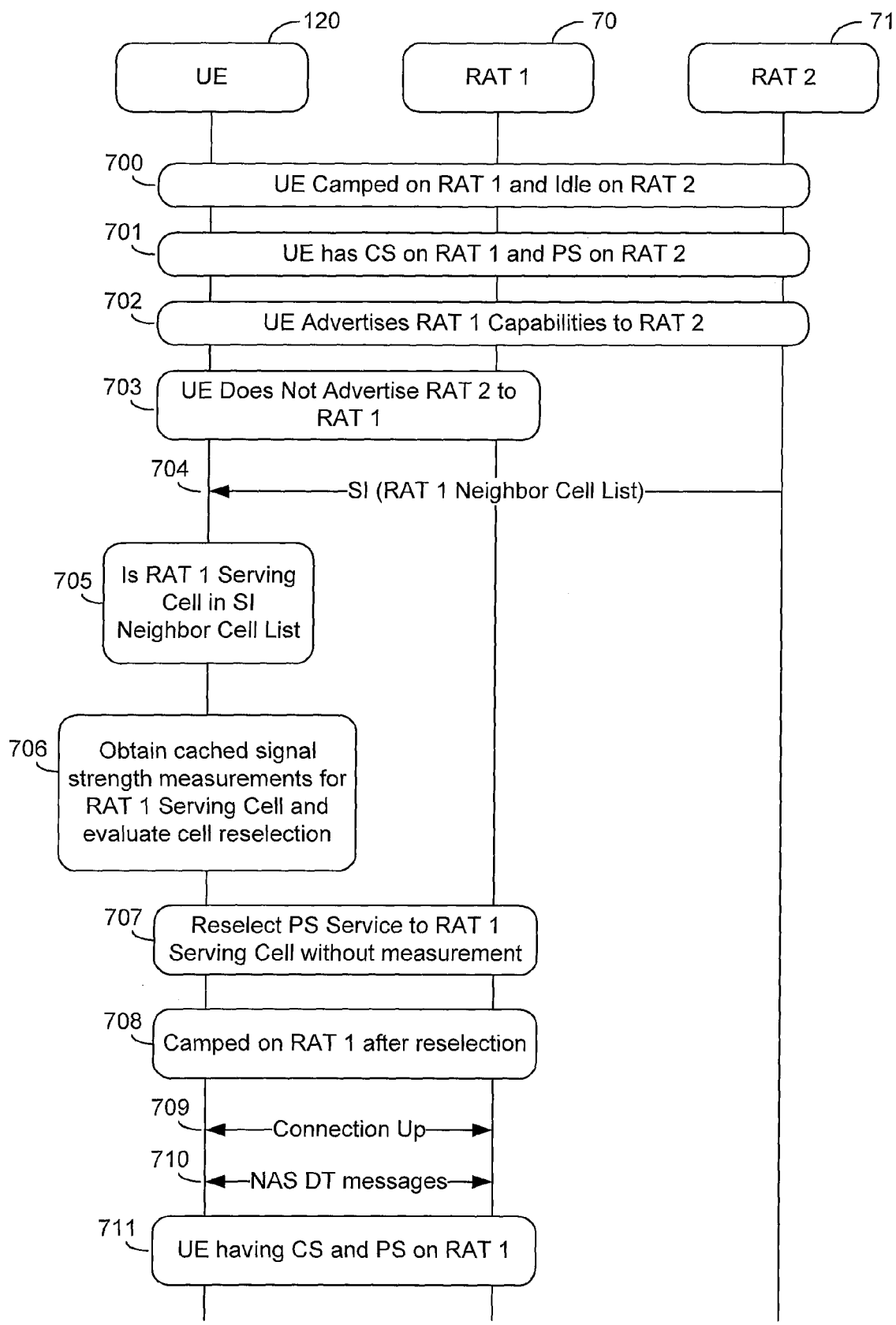
FIGS. 7-9 are call flow diagrams illustrating example call flows of a UE configured according to various aspects of the present disclosure.

FIG. 7 is a call flow diagram illustrating a typical call flow that takes place between a UE 120, configured according to one aspect of the present disclosure, a RAT 1 cell 70, and a RAT 2 cell 71. UE 120 is a simultaneous, dual RAT device that is capable of simultaneous communication services with both RAT 1 and RAT 2. At 700, UE 120 is camped on RAT 1 cell 70 and in an idle state on RAT 2 cell 71. At 701, UE 120 operates such that circuit switched communication services occur with RAT 1 cell 70 and packet switched communication services occur with RAT 2 cell 71. As a part of its communications with each of RAT 1 cell 70 and RAT 2 cell 71, at 702, UE 120 advertises its RAT 1 capabilities to RAT 2 cell 71, while, at 703, UE 120 does not advertise its RAT 2 capabilities to RAT 1 cell 70. UE 120 does not advertise its RAT 2 capabilities to RAT 1 cell 70 because UE 120 does not want any RAT 1 packet switched communications to be mixed up in transferring to RAT 2 cell 71 from RAT 1 cell 70 at the same time that packet switched communications may be transferring from RAT 2 cell 71 to RAT 1 cell 70. This mix up in both directions could cause a service impact in moving from one radio to another.

At 704, RAT 2 cell 71 sends system information that includes a neighbor list of RAT 1 cells. At 705, UE 120 considers whether its currently serving cell, RAT 1 cell 70 is included in the neighbor list. If so, then, at 706, UE 120 obtains cached signal strength measurements for RAT 1 cell 70. The signal strength measurements may include measurements such as RSSI or the like. Using the signal strength measurements, UE 120 evaluates cell reselection for packet switched communication services to RAT 1 cell 70.

At 707, UE 120 reselects packet switched service to RAT 1 cell 70 without making any new measurements. After reselection, at 709, UE 120 is now camped on RAT 1 cell 70. At 709, the packet switched connection with RAT 1 cell 70 is initiated between UE 120 and RAT 1 cell 70. Non-access stratum (NAS) direct transfer (DT) messages are exchanged, at 710, between UE 120 and RAT 1 cell 70. The NAS DT messages provide routing area updates for UE 120 to RAT 1. The resulting operation of UE 120, at 711, provides for both circuit switched and packet switched communication services using RAT 1 70.

Figure 8:
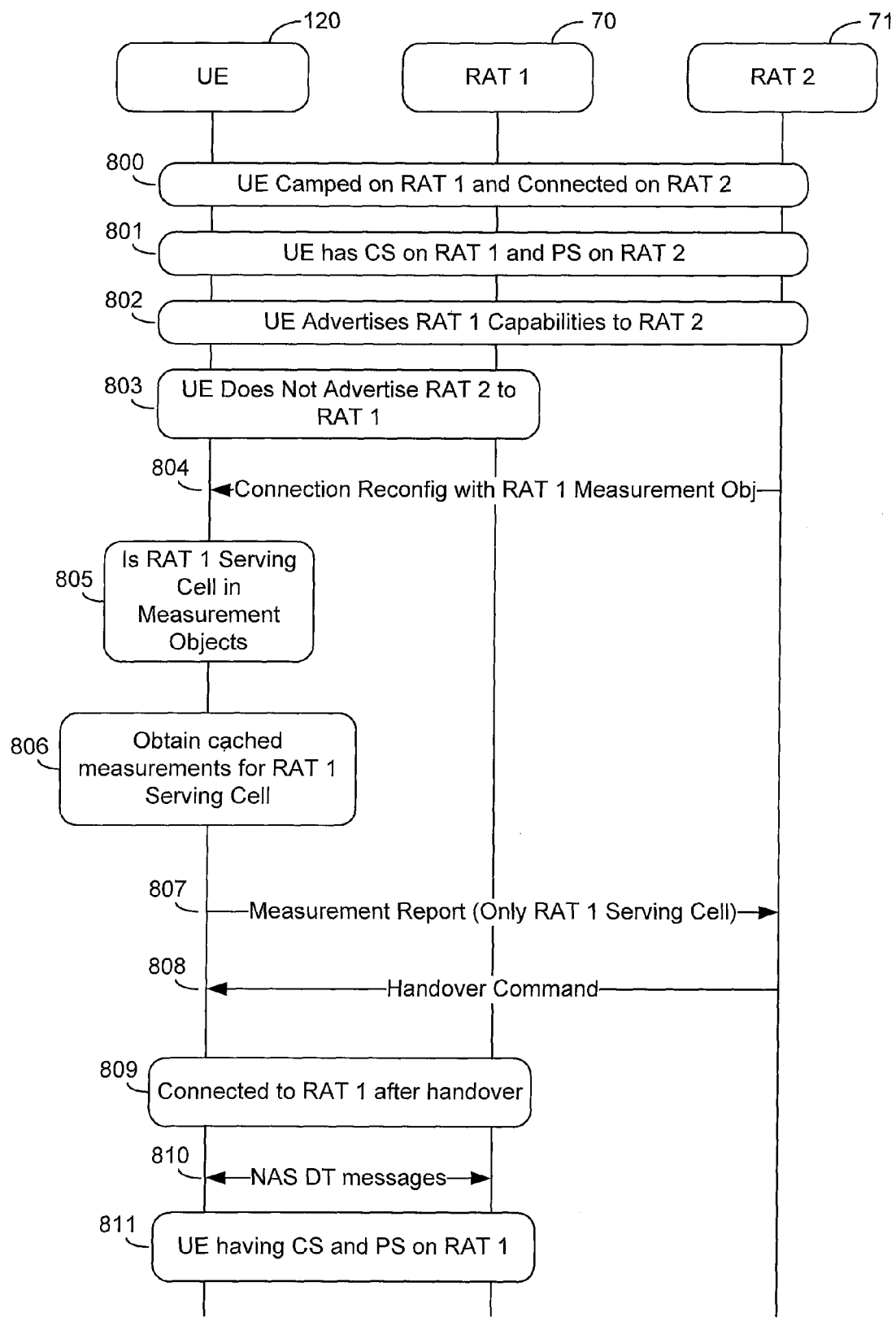

FIG. 8 is a call flow diagram illustrating a typical call flow, such as shown in FIG. 7, however, in FIG. 8, UE 120 is connected on RAT 2 cell 71. The call flow processes at 800-803 are similar to the call flow processes at 700-703 (FIG. 7) except that at 800, UE 120 is camped on RAT 1 cell 70 and connected at RAT 2 cell 71. UE maintains circuit switched communication on RAT 1 cell 70 and packet switched communication on RAT 2 cell 71, at 801, and the same full advertising to RAT 2 cell 71, at 802, and partial advertising to RAT 1 cell 70, at 803.

At 804, in the connected state with RAT 2 cell 71, UE 120 receives a connection reconfiguration message that includes multiple RAT 1 measurement objects for measuring surrounding RAT 1 cells. At 805, UE 120 determines whether its current RAT 1 serving cell, RAT 1 cell 70, is included as one of the measurement objects in the connection reconfiguration message. If so, then, at 806, UE 120 obtains cached measurements for RAT 1 cell 70. As its serving RAT 1 cell, UE 120 will periodically take various measurement metrics of the connection with RAT 1 cell.

At 807, UE 120 packages the cached measurement information for RAT 1 cell 70 into a measurement report and sends the measurement report to RAT 2 cell 71. The measurement report may contain only measurements for RAT 1 cell 70, regardless of whether the RAT 1 measurement objects include other neighboring RAT 1 cells. RAT 2 cell 71, therefore, makes its handover decision based only on the measurements of the serving RAT 1 cell, RAT 1 cell 70. At 808, RAT 2 cell 71 sends a handover command to UE 120, which directs UE 120 to handover packet switched communication services currently on RAT 2 cell 71 to RAT 1 cell 70.

At 809, UE 120 is connected to RAT 1 cell 70 for packet switched communication. Call flows at 810 and 811 are similar to the call flows 710 and 711 (FIG. 7), in which NAS DT messages are exchanged, at 810, and both circuit switched and packet switched communications are now occurring on RAT 1 cell 70 for UE 120.

Figure 9:
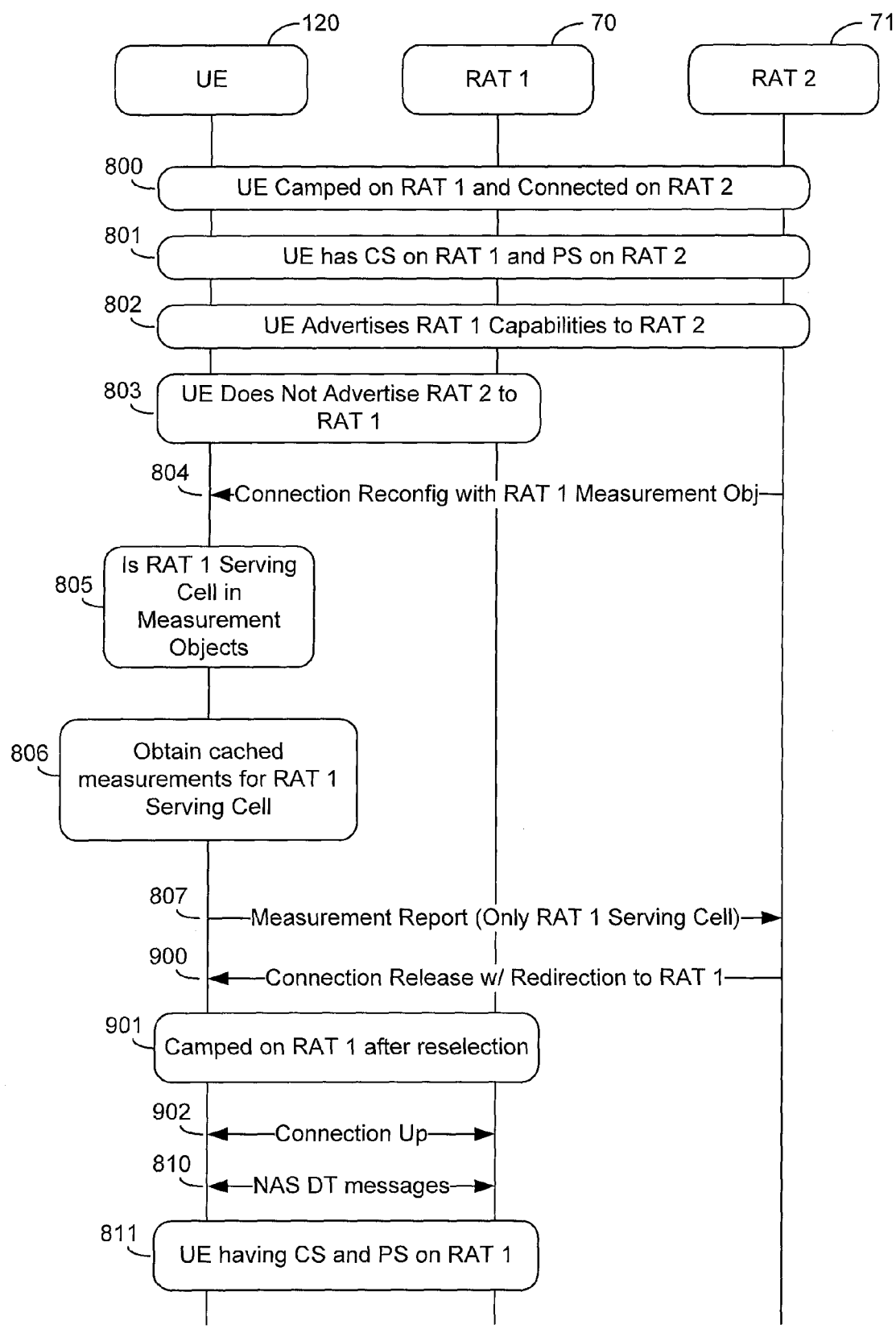

FIG. 9 is a call flow diagram illustrating a typical call flow, such as shown in FIGS. 7 and 8, however, in FIG. 9, UE 120 is connected on RAT 2 cell 71 and will be redirected instead of handed over. The call flow processes at 800-807 and 810-811 are the same as in FIG. 8 and will not be described again with respect of FIG. 9. At 900, after receiving the measurement report from UE 120, at 807 that contains only the measurement information for RAT 1 cell 70, RAT 2 cell 71 makes a redirection determination and sends a connection release message along with a redirection message for redirecting to RAT 1 cell 70. AT 901, after redirection, UE 120 is not camped on RAT 1 cell 70. The connection between UE 120 and RAT 1 cell 70 is initiated at 902. The call flow at 810 and 811 is the same as described in FIG. 8 such that, at 811, UE 120 ends up with both circuit switched and packet switched communication services connected through RAT 1 cell 70.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 6A, and 6B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer readable storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   detecting, at a user equipment (UE), a mobility event triggering transfer of first communication services at the UE from a first radio access technology (RAT) to a second RAT, wherein the UE is configured for simultaneous communication with the first and second RATs;
   receiving, by the UE, mobility transfer information from a second base station of the first RAT related to the transfer, wherein the mobility transfer information includes information for measurement of a plurality of neighboring second RAT base stations; and
   receiving, by the UE, second communication services from a first base station of the second RAT when the UE is in an idle state with the second base station of the first RAT related to the first communication services; and
   modifying, by the UE, evaluation of reselection criteria for the selection of the first base station of the second RAT for the first communication services that are originally handled by the second base station of the first RAT without interruption of the receiving the second communication services from the first base station of the second RAT, wherein the modifying comprises evaluating the reselection criteria based at least in part on cached measurement information for the first base station.

2. The method of claim 1, wherein the mobility transfer information comprises a neighbor list of cells configured for communication in the second RAT.

3. The method of claim 2, wherein the cached measurement information includes a signal strength indicator related to the first base station.

4. The method of claim 2, wherein the modifying is performed when it is determined that the first base station is included in the neighbor list.

5. The method of claim 2, further comprising one of:
reselecting to the first base station for the first communication service, when the first base station is present in the neighbor list of cells and the reselection criteria are met by the cached measurement information; and
determining, by the UE, not to perform cell reselection when the first base station is not included in the neighbor list of cells.

6. An apparatus configured for wireless communication, comprising:
means for detecting, at a user equipment (UE), a mobility event triggering transfer of first communication services at the UE from a first radio access technology (RAT) to a second RAT, wherein the UE is configured for simultaneous communication with the first and second RATs;
means for receiving, by the UE, mobility transfer information from a second base station of the first RAT related to the transfer, wherein the mobility transfer information includes information for measurement of a plurality of neighboring second RAT base stations; and
means for receiving, by the UE, second communication services from a first base station of the second RAT when the UE is in an idle state with the second base station of the first RAT related to the first communication services; and
means for modifying, by the UE, evaluation of reselection criteria for selection of the first base station of the second RAT for the first communication services that are originally handled by the second base station of the first RAT without interruption of the receiving the second communication services from the first base station of the second RAT, wherein the means for modifying comprises means for evaluating the reselection criteria based at least in part on cached measurement information for the first base station.

7. The apparatus of claim 6, wherein the mobility transfer information comprises a neighbor list of cells configured for communication in the second RAT.

8. The apparatus of claim 7, wherein the cached measurement information includes a signal strength indicator related to the first base station.

9. The apparatus of claim 7, wherein the means for modifying is performed when it is determined that the first base station is included in the neighbor list.

10. The apparatus of claim 7, further comprising one of:
means for reselecting to the first base station for the first communication service, when the first base station is present in the neighbor list of cells and the reselection criteria are met by the cached measurement information; and
means for determining, by the UE, not to perform cell reselection when the first base station is not included in the neighbor list of cells.

11. A computer program product for wireless communications in a wireless network, comprising:
a non-transitory computer-readable medium having program code recorded thereon, the program code including:
program code for causing a computer to detect, at a user equipment (UE), a mobility event triggering transfer of first communication services at the UE from a first radio access technology (RAT) to a second RAT, wherein the UE is configured for simultaneous communication with the first and second RATs;
program code for causing the computer to receive, by the UE, mobility transfer information from a second base station of the first RAT related to the transfer, wherein the mobility transfer information includes information for measurement of a plurality of neighboring second RAT base stations; and
program code for causing the computer to receive, by the UE, second communication services from a first base station of the second RAT when the UE is in an idle state with the second base station of the first RAT related to the first communication services; and
program code for causing the computer to modify, by the UE, evaluation of reselection criteria for selection of the first base of the second RAT for the first communication services that are originally handled by the second base station of the first RAT without interruption of the receiving the second communication services from the first base station of the second RAT, wherein the program code for causing the computer to modify comprises program code for causing the computer to evaluate the reselection criteria based at least in part on cached measurement information for the first base station.

12. The computer program product of claim 11, wherein the mobility transfer information comprises a neighbor list of cells configured for communication in the second RAT.

13. The computer program product of claim 12, wherein the cached measurement information includes a signal strength indicator related to the first base station.

14. The computer program product of claim 12, wherein the program code for causing the computer to modify is performed when it is determined that the first base station is included in the neighbor list.

15. The computer program product of claim 12, further comprising one of:
program code for causing the computer to reselect to the first base station for the first communication service, when the first base station is present in the neighbor list of cells and the reselection criteria are met by the cached measurement information; and
program code for causing the computer to determine, by the UE, not to perform cell reselection when the first base station is not included in the neighbor list of cells.

16. An apparatus configured for wireless communication, the apparatus comprising:
at least one processor; and
a memory coupled to the at least one processor,
wherein the at least one processor is configured:
to detect, at a user equipment (UE), a mobility event triggering transfer of first communication services at the UE from a first radio access technology (RAT) to a second RAT, wherein the UE is configured for simultaneous communication with the first and second RATs;
to receive, by the UE, mobility transfer information from a second base station of the first RAT related to the transfer, wherein the mobility transfer information includes information for measurement of a plurality of neighboring second RAT base stations; and
to receive, by the UE, second communication services from a first base station of the second RAT when the UE is in an idle state with the second base station of the first RAT related to the first communication services; and to modify, by the UE, evaluation of reselection criteria for selection of the first base station of the second RAT for the first communication services that are originally handled by the second base station of the first RAT without interruption of the receiving the second communication services from the first base station of the second RAT, wherein the configuration of the at least one processor to modify comprises configuration to evaluate the reselection criteria based at least in part on cached measurement information for the first base station.

17. The apparatus of claim 16, wherein the mobility transfer information comprises a neighbor list of cells configured for communication in the second RAT.

18. The apparatus of claim 17, wherein the cached measurement information includes a signal strength indicator related to the first base station.

19. The apparatus of claim 17, wherein the configuration of the at least one processor to modify is performed when it is determined that the first base station is included in the neighbor list.

20. The apparatus of claim 17, further comprising one of:
configuration of the at least one processor to reselect to the first base station for the first communication service, when the first base station is present in the neighbor list of cells and the reselection criteria are met by the cached measurement information; and
configuration of the at least one processor to determine, by the UE, not to perform cell reselection when the first base station is not included in the neighbor list of cells.

* * * * *